US010481879B2

(12) United States Patent
Stevens et al.

(10) Patent No.: US 10,481,879 B2
(45) Date of Patent: Nov. 19, 2019

(54) CODE DEVELOPMENT USING CONTINUED MACHINE LEARNINGS

(71) Applicant: Microsoft Technology Licensing, LLC, Redmond, WA (US)

(72) Inventors: Joshua Bates Stevens, Issaquah, WA (US); John S. Tilford, Seattle, WA (US); Guillermo Serrato Castilla, Seattle, WA (US); Srivatsn Narayanan, Bothell, WA (US); Simon Calvert, Sammamish, WA (US); Mark Alistair Wilson-Thomas, Mercer Island, WA (US); Deborah Chen, Seattle, WA (US); Miltiadis Allamanis, Cambridge (GB); Marc Manuel Johannes Brockschmidt, Cambridge (GB); Kesavan Shanmugam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/942,279

(22) Filed: Mar. 30, 2018

(65) Prior Publication Data
US 2019/0243617 A1 Aug. 8, 2019

Related U.S. Application Data

(60) Provisional application No. 62/627,607, filed on Feb. 7, 2018.

(51) Int. Cl.
*G06F 9/44* (2018.01)
*G06F 8/35* (2018.01)
(Continued)

(52) U.S. Cl.
CPC ............ *G06F 8/35* (2013.01); *G06F 8/75* (2013.01); *G06N 20/00* (2019.01)

(58) Field of Classification Search
CPC ............ G06F 8/35; G06F 8/33; G06F 8/34
(Continued)

(56) References Cited

U.S. PATENT DOCUMENTS

| 5,210,837 A * | 5/1993 | Wiecek | G06F 8/30 |
| | | | 717/104 |
| 7,343,585 B1 * | 3/2008 | Lau | G06F 16/254 |
| | | | 717/108 |

(Continued)

OTHER PUBLICATIONS

Tang et al, "Enhancing Defect Prediction with Static Defect Analysis", ACM, pp. 1-9, 2015 (Year: 2015).*
(Continued)

*Primary Examiner* — Anil Khatri
(74) *Attorney, Agent, or Firm* — Workman Nydegger

(57) ABSTRACT

Improving how a codebase, which may include source code, related databases, test files, code history, and/or changes, is drafted, edited, debugged, or otherwise developed. Machine learning is performed on a model codebase to establish a machine learning model. When a change to a codebase occurs, the machine learning model may be applied to evaluate that change. A change context providing context for this change is accessed. An analyzer then analyzes the change using the machine learning model and at least a part of the change context to generate an analysis result. Some information about the result is rendered. After rendering that information, a determination regarding how a user responded to the information is performed, and a subsequent analysis is then modified based on the user's response.

17 Claims, 11 Drawing Sheets

(51) Int. Cl.
*G06F 8/75* (2018.01)
*G06N 20/00* (2019.01)

(58) Field of Classification Search
USPC .................................. 717/101–107, 120–122
See application file for complete search history.

(56) References Cited

U.S. PATENT DOCUMENTS

| | | | | | |
|---|---|---|---|---|---|
| 7,657,868 | B2* | 2/2010 | Shenfield | ................... | G06F 8/20 715/763 |
| 7,661,088 | B2* | 2/2010 | Burke | ....................... | G06F 8/71 715/762 |
| 7,676,786 | B2* | 3/2010 | Shenfield | ................... | G06F 8/10 717/104 |
| 7,721,252 | B2* | 5/2010 | Choi | ......................... | G06F 8/10 717/100 |
| 7,788,640 | B2* | 8/2010 | Grimaldi | .................. | G06F 8/73 717/120 |
| 7,895,566 | B2* | 2/2011 | Shenfield | ................... | G06F 8/20 717/106 |
| 7,899,777 | B2* | 3/2011 | Baier | ..................... | G06Q 10/06 706/60 |
| 7,992,128 | B2* | 8/2011 | Hammerich | ........ | G06F 9/44505 717/106 |
| 8,195,803 | B2* | 6/2012 | Zhang | ...................... | G06F 8/00 370/351 |
| 8,418,137 | B2* | 4/2013 | Hoche | ................... | G06F 9/3017 717/121 |
| 9,569,179 | B1* | 2/2017 | Kachmar | .................. | G06F 8/30 |
| 10,048,946 | B2* | 8/2018 | Krishnan | .................. | G06F 8/34 |

OTHER PUBLICATIONS

Parr et al, "Analyzing Feature Generation for Value-Function Approximation", ACM, pp. 737-744, 2007 (Year: 2007).*
Srinivasan et al, "Machine Learning Approaches to Estimating Software Development Efforts", IEEE, pp. 126-137 (Year: 1995).*
Allamanis et al, "A Survey of Machine Learning for Big Code and Naturalness", ACM, pp. 1-37 (Year: 2018).*
Patel et al, "Gestalt: Integrated Support for Implementation and Analysis in Machine Learning", ACM, pp. 37-46 (Year: 2010).*
Lee et al, "A Deep Learning Model Generation Method for Code Reuse and Automatic Machine Learning", ACM, pp. 47-52 (Year: 2018).*
Shimonaka et al, "Identifying Auto-Generated Code by Using Machine Learning Techniques", IEEE, pp. 18-23 (Year: 2016).*
Bleier, Jakob, "Improving the Usefulness of Alerts Generated by Automated Static Analysis Tools", Retrieved From: https://www.ru.nl/publish/pages/769526/z_jakob_bleier.pdf, Apr. 3, 2017, 70 Pages.
"International Search Report and Written Opinion Issued in PCT Application No. PCT/US19/016206", dated May 2, 2019, 10 Pages.

* cited by examiner

```
                                -- Function
                                --------- local function vardetermine(var, display)
        if var = 5 then
            return string.format ('[[%s]]', page)
        end
    end
```

SmartBot @ 1/1/2018

Based on this repo's code patterns, SmartBot suggests renaming "var" as "foo" with confidence 89%.

User 1 @ 1/1/2018 13:52:01

You need to test this code.

User 2 @ 1/1/2018 13:55:06

I don't think that's a good variable name.

SmartBot @ 1/1/2018 13:55:32

Based on this repo's code patterns, SmartBot suggests renaming "var" as "foo" with confidence 89%.

User 3 @ 1/2/2018 14:32:24

How is this code?

*FIG. 10*

CODE DEVELOPMENT USING CONTINUED MACHINE LEARNINGS

CROSS-REFERENCE TO RELATED APPLICATIONS

This application claims the benefit of and priority to U.S. Provisional Patent Application Ser. No. 62/627,607 filed on Feb. 7, 2018 and entitled "CODE DEVELOPMENT USING CONTINUED MACHINE LEARNINGS," which application is expressly incorporated herein by reference in its entirety.

BACKGROUND

Computers and related technology have impacted many aspects of society. Indeed, a computer's ability to process information and to execute applications has transformed the way we both live and work.

A computer operates by executing a set of executable instructions (i.e. source code). These instructions are typically created in a development environment by a code developer who is designing an application. In many instances, the developer will iteratively change the code in an effort to improve the code's execution and to remove any coding bugs or errors. Once the instructions are compiled, interpreted, and/or built, a computer then executes the instructions to provide the developed functionalities.

Different tools have been created to assist a developer in writing, editing, testing, and debugging an application's source code. Some of these tools include program code text editors, source code editors, debuggers, and integrated development environments (IDEs), just to name a few. In addition to using helpful tools, the process of generating and refining source code can be further improved by receiving suggestions from other entities.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to improving how a codebase is drafted, edited, debugged, or otherwise developed. This is achieved, at least in part, by analyzing a codebase using a codebase analysis service and then by asynchronously displaying the service's analysis results. The service initially "learns" (e.g., through machine learning and training) what model code looks like by identifying and analyzing patterns, semantics, and other coding techniques (hereinafter collectively referred to as "coding practices") from a corpus of model data. Furthermore, the service not only learns the coding practices of the model data, but the service may also learn what actions have previously been taken in connection with those coding practices.

Based on this learned information, the service develops a learning model. Using this learning model, the service may optionally be run against one or more other codebases to also learn the coding practices from those other codebases. In this manner, the learning model may be tuned specifically for these other codebases. Subsequently, when a change later occurs to one of those other codebases (which change may be detected via a notification that the service receives), the service can be run against that codebase to determine whether that codebase, as now changed, conforms with the service's learned coding practices. If there are discrepancies between the codebase (e.g., the changes that were made) and the learned coding practices, or even if there are other points of interest in that codebase (e.g., a non-limiting example may include insufficient documentation in the codebase), then the service may provide suggestions, insights, and/or other information in an effort to improve that codebase.

Here, the phrase "suggestions, insights, and other information" refers to the analysis results that are generated by the service as a consequence of the service analyzing the codebase. As such, the phrase "suggestions, insights, and other information" is interchangeable with the phrase "analysis results" or even "results of the analysis." For brevity, "suggestions, insights, and other information" may be shortened to simply "insights."

To generate these insights, a change context is accessed. This change context provides context specifically for the changed portion of the codebase. With this information, an analyzer is able to perform an analysis on at least the changed portion of the codebase using the change context. Once the analysis is complete, then the results of that analysis are detected. Subsequently, some of the information about those results is rendered to a user.

In addition to offering insights on how to improve a changed codebase, the service is also able to dynamically and continuously update the learning model based on how a developer reacted to the service's insights. In particular, the service is able to determine how the developer responded to the rendered information. In this manner, the service (and in particular the learning model) is able to dynamically and continuously grow and learn from past experiences (e.g., by modifying a subsequent analysis performed by one (or more) of the service's analyzers). By perpetually learning in this manner, the service will continue to provide more detailed and/or thoughtful insights on how a codebase may be improved.

Therefore, significant advantages are realized because better suggestions are provided to the developer. Additionally, if the analysis is done during the initial stages of the code development process, the code developers will be able to resolve issues much earlier in the development pipeline process. Such opportunity significantly decreases production cost while dramatically improving efficiency.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 8 illustrates an example user interface that may be used to display the results of a code analysis, where the results are presented in such a way that a human developer is able to recognize that the results include both an action item and perhaps, though not necessary, a level of confidence that the action item is a worthwhile solution to an identified issue.

FIG. 10 illustrates an example collaborative code review user interface that may be used to display the results of a code analysis to a developer as well as to other developers.

DETAILED DESCRIPTION

Figure 1:
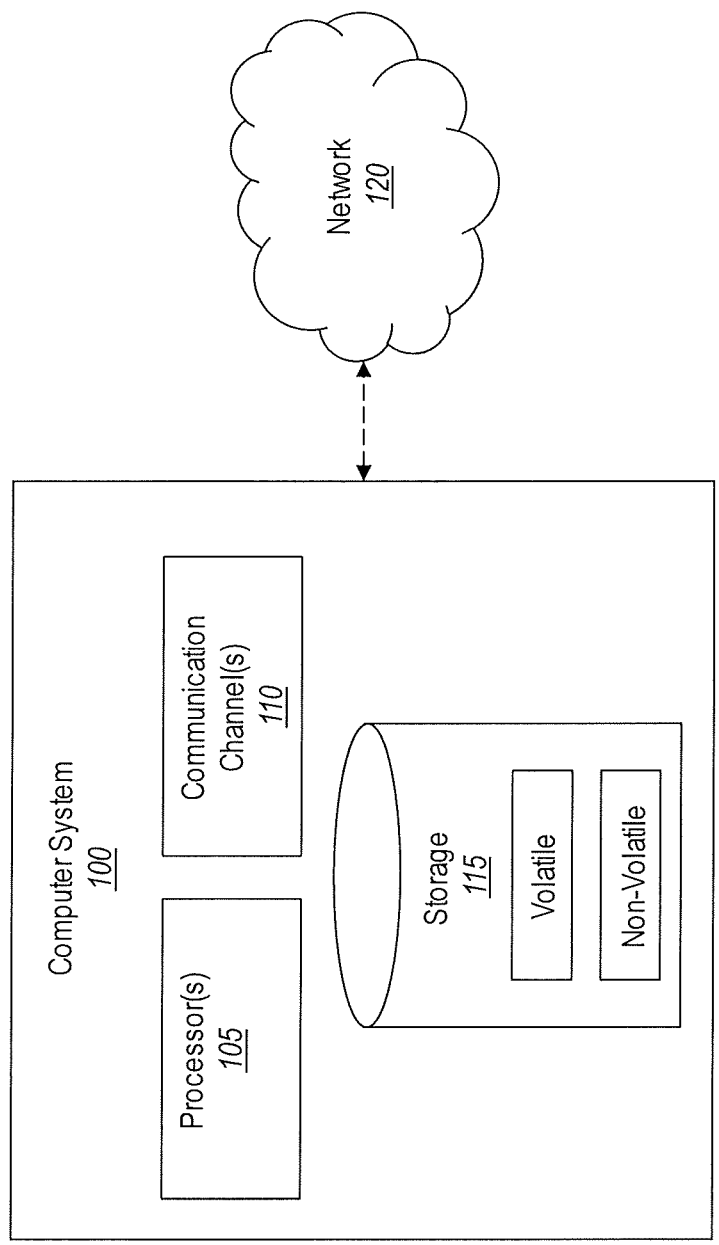
FIG. 1 illustrates an overview of an example computer system, including an illustration of some of its features and functionalities.

At least some embodiments described herein relate to improving how a codebase is drafted, edited, debugged, or otherwise developed. This is achieved, at least in part, by analyzing a codebase using a codebase analysis service and then by asynchronously displaying the service's analysis results. The service initially "learns" (e.g., through machine learning and training) what model code looks like by identifying and analyzing patterns, semantics, and other coding techniques (hereinafter collectively referred to as "coding practices") from a corpus of model data. Furthermore, the service not only learns the coding practices of the model data, but the service may also learn what actions have previously been taken in connection with those coding practices.

Based on this learned information, the service develops a learning model. Using this learning model, the service may optionally be run against one or more other codebases to also learn the coding practices from those other codebases. In this manner, the learning model may be tuned specifically for these other codebases. Subsequently, when a change later occurs to one of those other codebases (which change may be detected via a notification that the service receives), the service can be run against that codebase to determine whether that codebase, as now changed, conforms with the service's learned coding practices. If there are discrepancies between the codebase (e.g., the changes that were made) and the learned coding practices, or even if there are other points of interest in that codebase (e.g., a non-limiting example may include insufficient documentation in the codebase), then the service may provide suggestions, insights, and/or other information in an effort to improve that codebase.

Here, the phrase "suggestions, insights, and other information" refers to the analysis results that are generated by the service as a consequence of the service analyzing the codebase. As such, the phrase "suggestions, insights, and other information" is interchangeable with the phrase "analysis results" or even "results of the analysis." For brevity, "suggestions, insights, and other information" may be shortened to simply "insights."

To generate these insights, a change context is accessed. This change context provides context specifically for the changed portion of the codebase. With this information, an analyzer is able to perform an analysis on at least the changed portion of the codebase using the change context. Once the analysis is complete, then the results of that analysis are detected. Subsequently, some of the information about those results is rendered to a user.

In addition to offering insights on how to improve a changed codebase, the service is also able to dynamically and continuously update the learning model based on how a developer reacted to the service's insights. In particular, the service is able to determine how the developer responded to the rendered information. In this manner, the service (and in particular the learning model) is able to dynamically and continuously grow and learn from past experiences (e.g., by modifying a subsequent analysis performed by one (or more) of the service's analyzers). By perpetually learning in this manner, the service will continue to provide more detailed and/or thoughtful insights on how a codebase may be improved.

Therefore, significant advantages are realized because better suggestions are provided to the developer. Additionally, if the analysis is done during the initial stages of the code development process, the code developers will be able to resolve issues much earlier in the development pipeline process. Such opportunity significantly decreases production cost while dramatically improving efficiency.

Having just described various advantages and high-level attributes of some of the disclosed embodiments, the disclosure will now turn to FIG. 1 which presents an introductory discussion of an example computer system. Following that discussion, the disclosure will focus on FIGS. 2 through 10 which discuss various methods, example architectures, and other supporting illustrations for using learned information to analyze a codebase.

Example Computer System

As illustrated in FIG. 1, in its most basic configuration, a computer system 100 includes various different components. As used herein, "computer system" and simply "computer" are synonymous terms that may be interchanged with each other. FIG. 1 also shows that computer system 100 includes at least one hardware processing unit 105 (aka a "processor"), communication channel(s) 110, and storage 115.

The storage 115 may be physical system memory, which may be volatile, non-volatile, or some combination of the two. Accordingly, the storage 115 may be referred to as a "hardware storage device" on which computer-executable instructions are stored. The term "memory" may also be used herein to refer to non-volatile mass storage such as physical storage media.

If the computer system 100 is distributed, the processing, memory, and/or storage capability may be distributed as well. As used herein, the term "executable module," "executable component," or even "component" can refer to software objects, routines, or methods that may be executed on the computer system 100. The different components, modules, engines, and services described herein may be implemented as objects or processors that execute on the computer system 100 (e.g. as separate threads).

The disclosed embodiments may comprise or utilize a special-purpose or general-purpose computer including computer hardware, such as, for example, one or more processors (such as hardware processing unit 105) and system memory (such as storage 115), as discussed in greater detail below. Embodiments also include physical and other computer-readable media for carrying or storing computer-executable instructions and/or data structures.

Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware/physical storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 100 may also be connected (via a wired or wireless connection) to external sensors (e.g., data acquisition devices). Further, the computer system 100 may also be connected through one or more wired or wireless networks 120 to remote systems(s) that are configured to perform any of the processing described with regard to computer system 100.

A "network," like the network 120 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. As illustrated, the computer system 100 includes one or more communication channel(s) 110 (e.g., TCP ports, UDP ports, etc.) that are used to communicate with the network 120.

Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, cloud-based machines and infrastructures, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components. For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

Example Technical Benefits

To build on the understanding presented above, additional background information will be helpful to understand some of the other advantages that are realized by following the principles disclosed herein. As briefly described earlier, developers often make changes to source code in an effort to continually improve that code. In many instances, developers often seek help from other developers who may provide suggestions and other feedback during the development process. This collaborative process helps to refine and perpetually improve the source code.

Often, however, other developers may not be immediately available, they may not catch a mistake or some other aspect that could be improved in the source code, or they may have implicit biases regarding how source code should be developed. For at least these reasons, it is beneficial to employ the use of a service that is able to independently analyze source code and to offer unbiased, objective suggestions on how the source code may be improved. Additionally, this service can be available at any time of day to suit the needs of the developer based on his/her schedule.

Furthermore, instead of performing a stale, unintelligent, or otherwise rote coding analysis based on a static set of rules (and offering poor suggestions based on that inadequate analysis), it is beneficial to provide a service that dynamically develops and updates a learning model by learning from the patterns and usages already established in a corpus of model data (e.g., a model codebase). Using this learning model, the service will beneficially offer insights on how to improve the codebase. In addition to the above functionalities, the service is also able to learn which insights the developer agrees with and which insights the developer does not agree with, or, more broadly, which actions were taken and which actions were not taken (e.g., collectively referred to as "implicit" feedback). Additional details on both explicit and implicit feedback will be provided later. In this manner, the service, through its continuous learning functionalities, is able to continually improve its analysis and present more intelligent and higher quality insights to the developer.

It follows then, that the service may mimic the role of a highly observant, precise, and intuitive human collaborator by offering its own customized insights. To clarify, the service may mimic a human developer and may offer customized insights that a human developer can immediately adopt, if desired. To assist the developer in determining the likelihood that a particular insight will resolve a potential issue, a level of confidence may also be presented with the insight. This level of confidence is an optional feature and may be embodied via a numeric value or via a strong or emphatic choice of words. As such, the developer can quickly gauge the potential worth of an insight using the level of confidence. Optionally, this confidence may at least partially be based on a prediction regarding how the human developer will react to the suggestion. Similarly, the confidence may be based on a prediction regarding how well the suggestion will resolve the potential issue.

With that said, the service may actually surpass the role of a human collaborator because it may catch points of interest in the codebase that a human developer may not catch (e.g., humans often get tired or lose focus when reviewing a codebase whereas the service will not). Accordingly, there is provided a specialized, computer-implemented service that offers intelligent insights on how to improve a codebase.

Figure 2A:
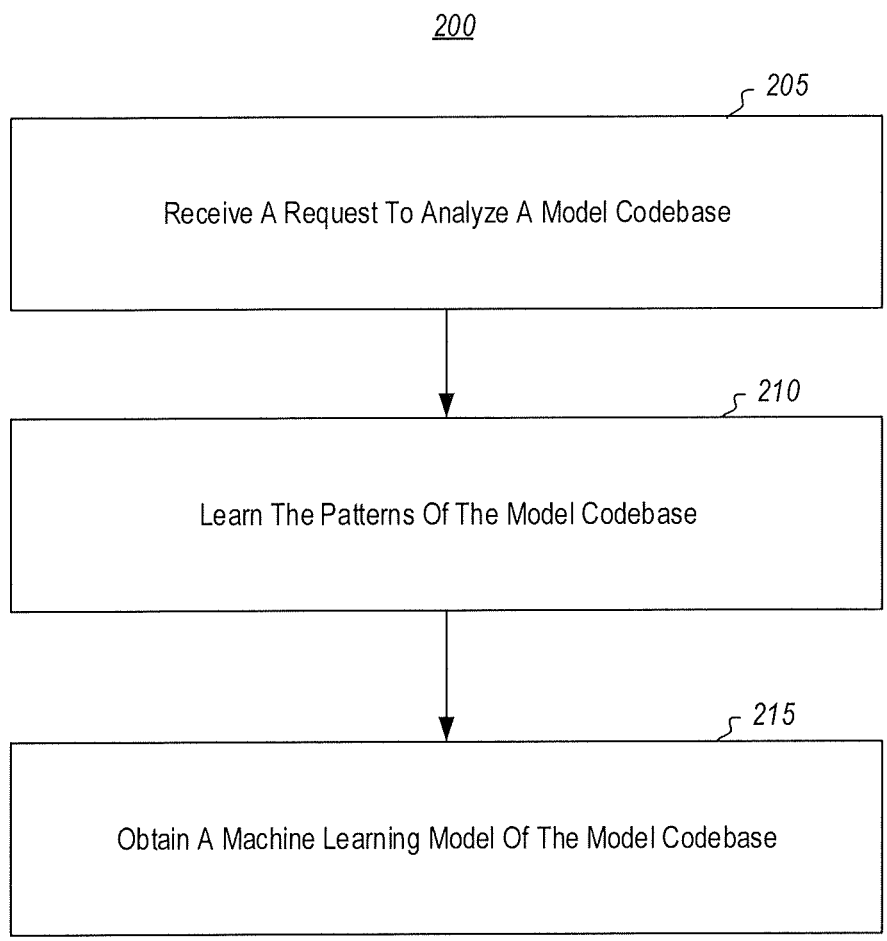
FIGS. 2A, 2B, and 2C show an example method that may be performed to improve how source code is developed through continued machine/service learning.
Figure 2B:
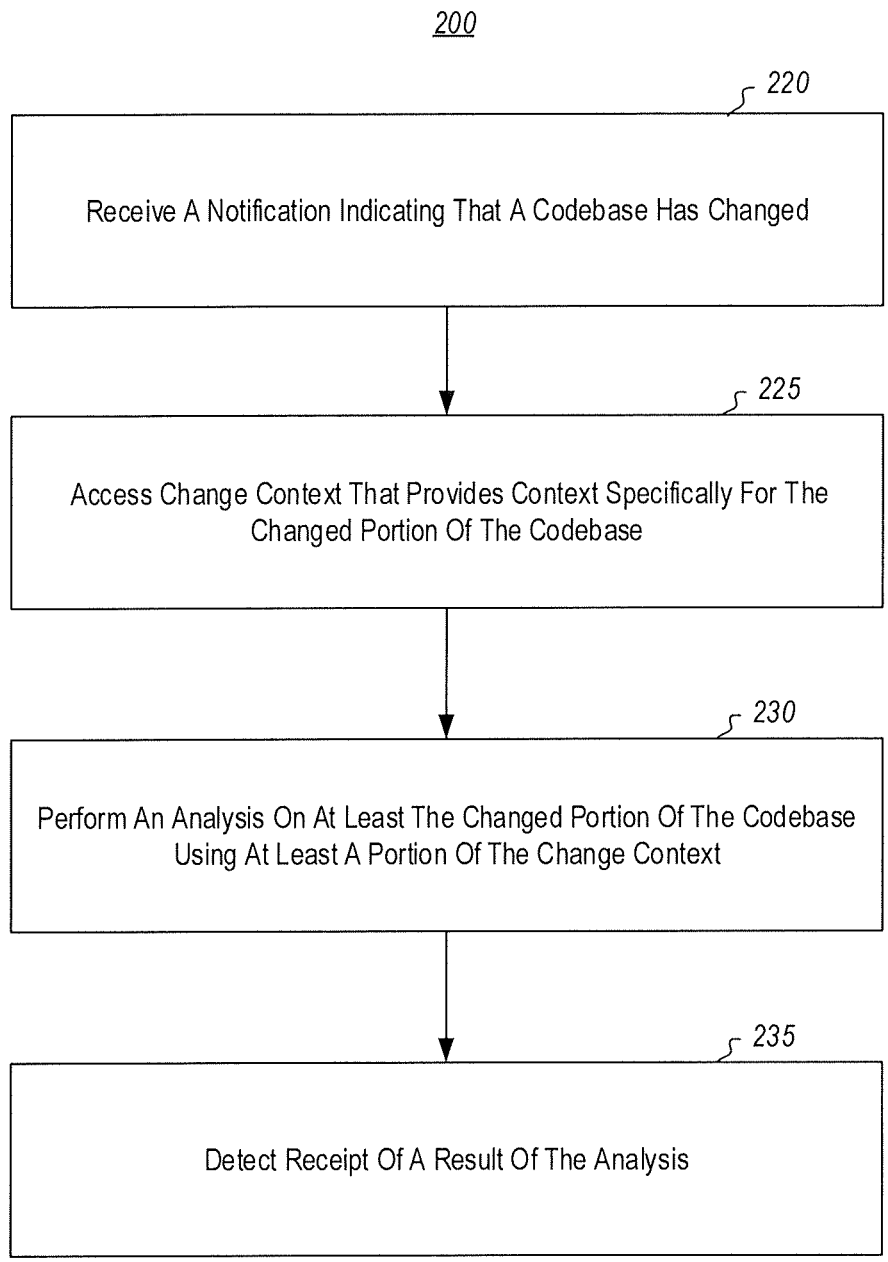
Figure 2C:
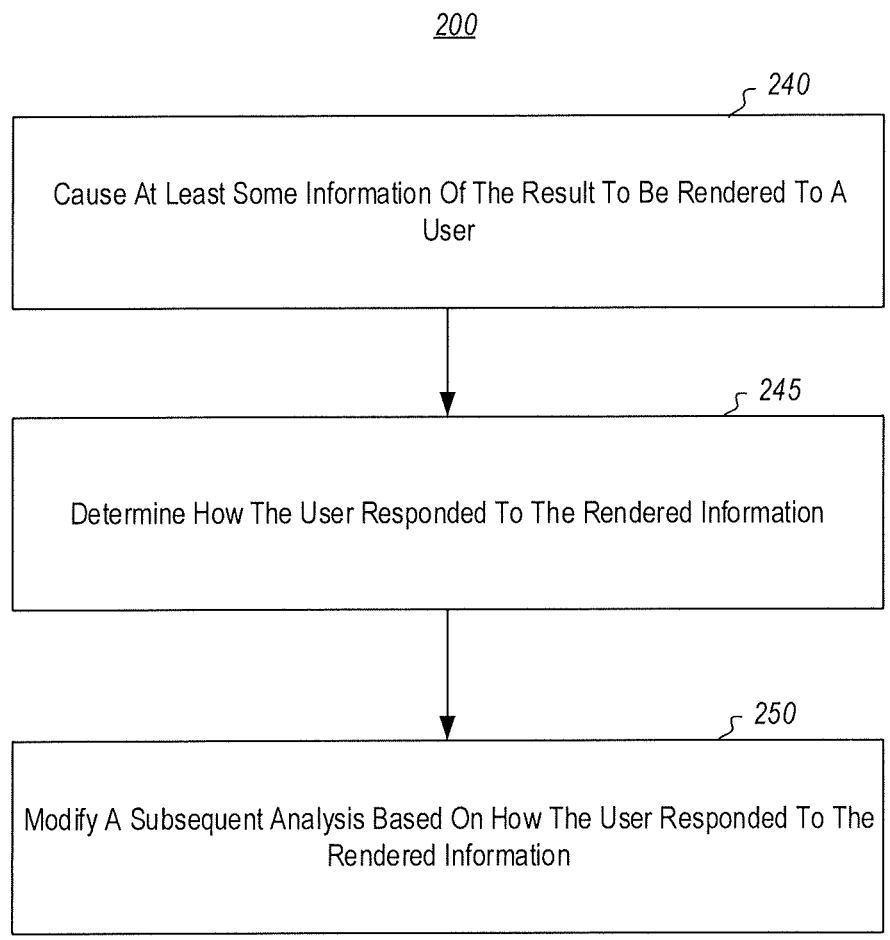

Methods for Learning from a Model Codebase and Applying the Learning to Other Codebases To build on the understanding presented above, the disclosure will now focus on FIGS. 2A through 2C which present an example method 200 that may be performed to improve the development of a codebase. In this description and in the claims, a "codebase" includes source code. However, a codebase may also include associated databases, test files, and/or metadata such as change history and changes made.

Initially, it is noted that method 200 has been distributed across three figures in order to improve its readability. This distribution should not be considered as an indication that one or more of the method acts are more important or relevant than any of the other method acts. Instead, the method has been logically divided to illustrate a codebase learning stage (FIG. 2A), a codebase change analysis stage (FIG. 2B), and a feedback stage (FIG. 2C).

With that said, it is also noted that method 200 may be performed by the computer system 100 of FIG. 1. As an example, the storage 115 may include computer-executable instructions that, when executed by the hardware processing unit 105, cause the computer system 100 to perform the method 200. In this manner, the computer system 100 may be configured, via the computer-executable instructions, to perform the acts of the method 200.

At this point in the disclosure, each of the method acts will be presented in a high-level, introductory manner. Following this high-level introduction, an architecture will be introduced to demonstrate how the various method acts may actually be implemented.

Turning first to FIG. 2A, during this initial codebase learning stage, a service running on a machine (e.g., the computer system 100 of FIG. 1) initially receives a request to analyze a model codebase that has been identified as being a corpus of model data (act 205). In some instances, this corpus may be very large. As will be described in more detail later, this model codebase is used to generate a learning model. Later, when the learning model is applied to another codebase (or perhaps to the same codebase after it has changed in some manner), then the learning model may be refined based on the information included within that other codebase.

In any event, the training may occur on a large amount of data and then the actual analysis of a codebase may be more fully refined. While the codebase at least includes a body of model source code, the codebase may also include metadata about the model source code (e.g., code history, changes, test files, databases, and so forth) as well as any other information about the model source code. In this manner, the service is able to receive a request to analyze and learn from a corpus of model data. As discussed throughout, this learning may be perpetual such that the learning may occur from both a corpus of data as well as other, perhaps smaller or more specific, codebases.

Given the directive provided by the request, the service then learns the various different patterns, semantics, usages, and coding techniques that are embodied within the corpus of model data (act 210). By applying machine learning on the corpus of model data, the service may then construct a "machine learning model," or simply a "learning model," of that corpus (act 215). A "model" may also be referred to as a machine-readable representation of that corpus. As such, this initial codebase learning stage constitutes a "pre-processing" phase that yields an operable base knowledge that at least includes the learning model. In some instances, this operable base knowledge may include additional source code, enterprise policy information, and/or additional metadata.

As discussed, this pre-processing is performed on a corpus of model data. This corpus of model data may include source code from a single project, or it may include a repository of many different source code projects. Of course, source code may be removed and/or added to this corpus at any time and for any reason. When such additions or removals occur, then the service may again learn from the corpus and update its learning model. Accordingly, regardless of how much model data is included in the corpus, the service is able to learn what model code looks like. In addition to learning from the corpus of model data, the service is also able to learn from developer feedback, as will be discussed later. In this manner, the service may perpetually learn from both past experiences and new experiences. Further details on these features will be discussed later.

To recap, this learning includes learning about (but not limited to) coding patterns, semantics, variable naming conventions, variable use patterns, code formatting, code documentation, and other factors involved with developing source code (collectively referred to as "coding practices"). Once the service has learned enough information to generate its own learning model, the service can then apply its learning to determine whether other codebases follow its learned coding practices. In addition to analyzing a codebase as a whole, the service is also able to analyze any changes that are made to the codebase to determine whether those changes conform with the service's learned coding practices.

With that background, attention will now be focused on FIG. 2B. This figure shows a codebase change analysis stage. In this stage, the service actually applies what it previously learned by analyzing either a new codebase or an existing codebase that has changed. In some instances, the service may initially learn the semantics in this new codebase and thus "tune" its learning model to the intricacies of the new codebase. Then, when a change occurs to that new codebase, the learning mode can determine whether those changes are in accordance with the service's learning model by analyzing the codebase, and particularly the changed portion of the codebase. As such, the service is able to tune its learning model for whatever codebase it is currently working on.

The analysis may be performed on the entirety of the codebase or on a selected portion of the codebase (e.g., the part that changed, hence the name "codebase 'change' analysis stage"). For reference, examples of an existing codebase may include the corpus of model data, an entirely different codebase, a source check-in history, or even a review history. By performing the codebase change analysis, the service can determine whether the codebase (in whole or in part e.g., the specific change) was written in accordance with the service's learned coding practices.

As shown in FIG. 2B, the method 200 includes an act of receiving a notification indicating that at least a portion of a codebase has changed (act 220). In some instances, this notification is received within an architecture that includes one or more analyzer components (hereinafter simply "analyzers") operating for the service. Next, method 200 includes an act of accessing or identifying a specific "context" for the changed portion of the codebase (hereinafter a "change context"). As used herein, this change context provides state information or other reference data for the changed portion of the codebase (act 225). To clarify, a "context," as used herein, describes a state of the codebase, and a "change context" describes specific state corresponding to the specific portion of the codebase that changed.

Method 200 additionally includes an act of performing, by at least one of the analyzers, an analysis on at least the changed portion of the codebase using at least a portion of the change context (act 230). After the analysis is complete, then the results of that analysis may be passed to another component in the architecture. As such, method 200 optionally includes an act of "receiving" the results of that analysis, or rather an act of detecting the receipt of those results (act 235). These results may include suggestions, insights, and/or other information designed to help improve the codebase. Further, these results (i.e. the insights) are generated by analyzing the codebase to identify points of interest that may be contrary to the service's learned coding practices.

In this manner, the service applies what it learned in the past onto another codebase. In some instances, the analysis results provide one or more of the following, (1) an identification of any identified issues with the changed source code, (2) at least one resolution on how to resolve those issues (e.g., by offering replacement code that may be used to fix the issues), and/or (3) an optional level of confidence associated with the resolution. These features will be discussed in more detail later.

Turning now to FIG. 2C, this figure focuses on a feedback stage in which additional learning is performed in order to update the service's learning model based on how the developer responded to the service's analysis results. Here, the method 200 includes an act of causing at least some information about the results to be rendered to the developer/user (act 240). As discussed, these results include the insights.

In addition to learning from a corpus of model data, the service is also able to learn from developer feedback. As such, method 200 additionally includes an act of determining how the developer/user responded (or did not respond) to the rendered information (act 245). Finally, the method 200 includes an act of modifying a subsequent analysis performed by at least the one analyzer based on how the developer/user responded to the rendered information (act 250). In this manner, the service (and in particular the analyzers) may dynamically alter or modify their subsequent analysis operations in order to perpetually improve their subsequent analysis results and to improve the development of source code, including associated databases, test files, and so forth. Therefore, based on this identified feedback, the service may continue to learn what model code looks like (as well as the particular coding techniques of the developer) and further modify/update its learning model so that the service can provide more refined or more useful insights in the future.

Example Architectures

Figure 3:
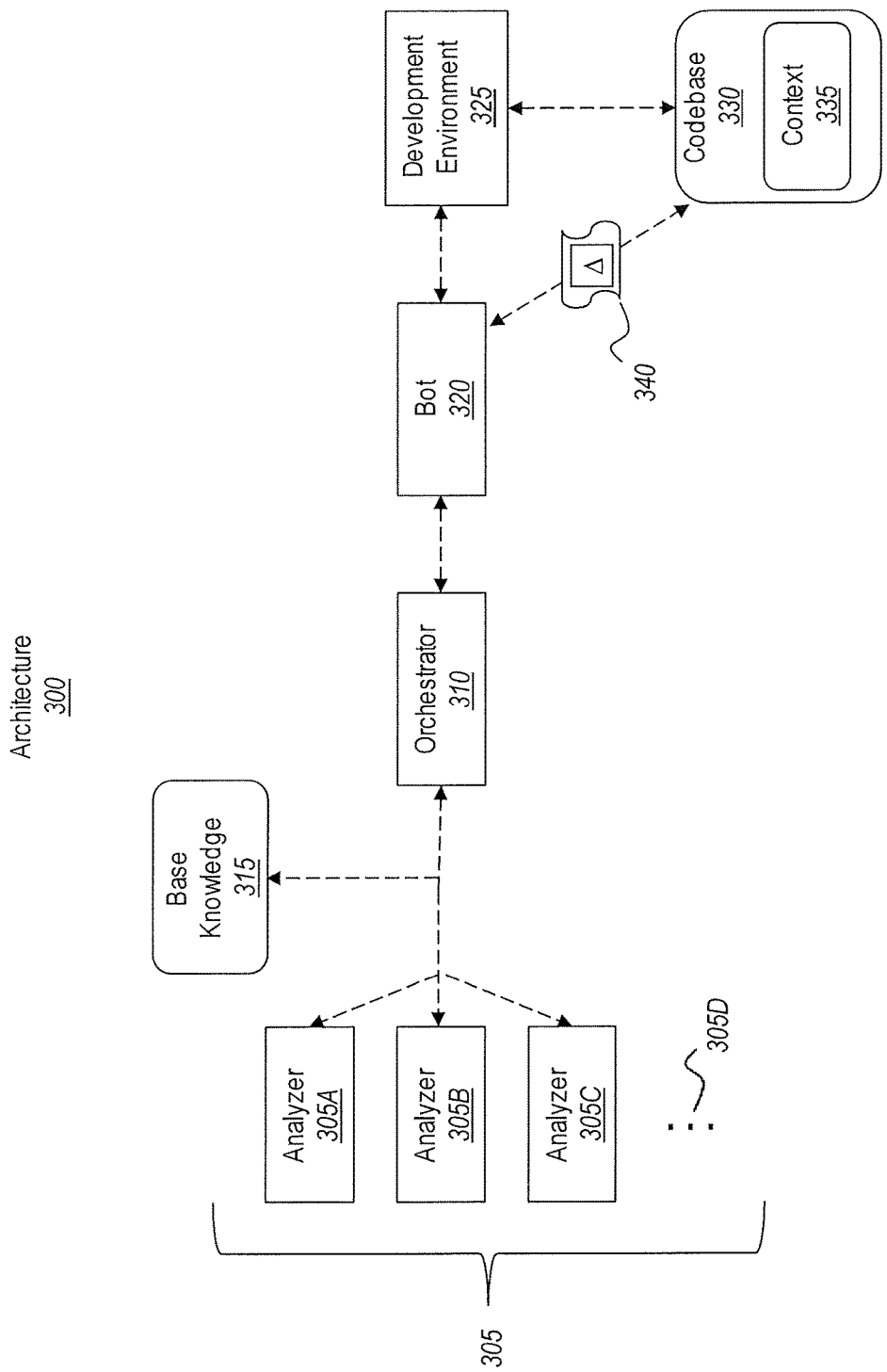
FIG. 3 provides an example architecture that may be used to improve the process of developing a codebase by continuously learning and adapting.

Having just described a method for using learned information to analyze a codebase and for learning from developer feedback based on the analysis results, the disclosure will now present an example architecture that is configured to perform these processes. Accordingly, FIG. 3 illustrates an example architecture 300 that may be used to facilitate the operations of method 200. To clarify, the architecture 300 includes various different components that may be configured to carry out the acts described in method 200. Additionally, the computer system 100 may operate within or with the architecture 300 to improve the development of a codebase which includes source code, associated databases, test files, and so forth. With that in mind, the disclosure will first introduce the various components at a high level. After that introduction, the disclosure will then describe in detail how those components operate to achieve the principles disclosed herein.

Accordingly, by way of introduction, architecture 300 includes multiple analyzers 305 (e.g., analyzer 305A, analyzer 305B, and analyzer 305C). Although architecture 300 is currently presented as having only three analyzers, the ellipsis 305D demonstrates that the architecture 300 may include any number of analyzers (e.g., one or more). Indeed, an analyzer may be added, removed, or modified at any time and for any reason.

The architecture 300 additionally includes an orchestrator 310 (i.e., an "orchestrator service") that manages when the analyzers 305 will be triggered to perform their analyses (either individually or collectively). As shown, orchestrator 310 as well as the analyzers 305 are also able to obtain information from a base knowledge repository 315, which may include the learning model that was discussed earlier. This will be discussed in much more detail after the architecture 300 is introduced as a whole.

Architecture 300 also includes a bot service 320 that communicates with the orchestrator 310. Additionally, the bot service 320 is able to communicate with a development environment 325. Furthermore, this bot service 320 is able to access information about a codebase 330. Similarly, the development environment 325 is also able to access the codebase 330.

One optional role of the bot service 320 is to gain an understanding of how the codebase 330 changes (i.e. a codebase change) and to package that understanding in a manner so that the orchestrator 310 will understand how to handle the analyzers 305. In some implementations, the bot service 320 may obtain this understanding from a client.

With that said, the development environment 325 may be considered a client, and the bot service 320 may obtain the information about the change from this client. As will be discussed in more detail later, the development environment 325 (i.e. an example of a client) may include an IDE or may include a control system that handles code review requests from developers. Here, the client may package information about the change and send that information to the bot service 320. Accordingly, regardless of which entity performs the processes to acquire the information about the changes, the bot service 320 eventually obtains information about those changes.

As shown in FIG. 3, the codebase 330 includes a context 335 that describes some or all of the state of the codebase 330. When the codebase 330 is changed, then the context 335 will update to reflect such a change. In one embodiment, the context 335 includes one or more tokens of an abstract syntax tree, a semantic graph of source code, or even a semantic graph of the codebase 330 as a whole.

It follows then that the bot service 320 is able to identify when the codebase 330 changes. As an example, FIG. 3 shows that the bot service 320 is able to identify, obtain, and/or receive information 340 about the changes made to the codebase 330. Additionally, this information 340 may include the context 335 of the codebase 330, or it may include only a selected sub-portion of the context 335 (e.g., a "change context").

Having just introduced the various components of the architecture 300, the disclosure will now focus on the relationship between these components and the method acts that were described in FIGS. 2A through 2C. Turning first to the development environment 325, this development environment 325 represents an interface which a developer (e.g., a human developer) may use to work on the codebase 330. By using the development environment 325, the developer can generate, edit (e.g., change), and/or debug the codebase 330.

Figure 4:
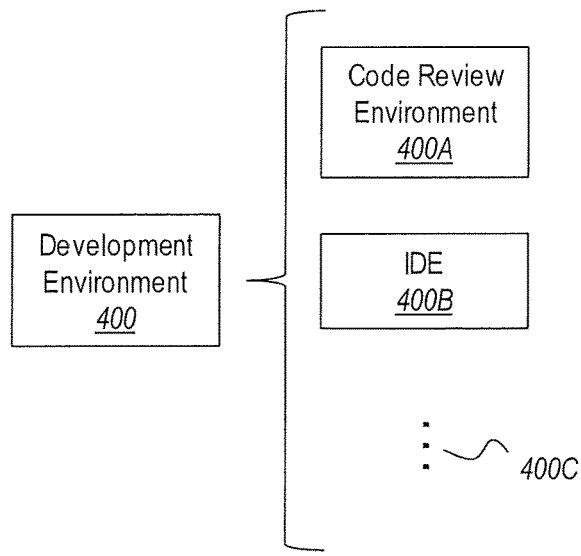
FIG. 4 shows some of the example development environments that a developer may use to make coding edits and to receive the results of a code analysis.

With that said, FIG. 4 shows a development environment 400 that is representative of the development environment 325 of FIG. 3. As shown, the development environment 400 may be embodied as a collaborative code review environment 400A or an integrated development environment (IDE) 400B. The ellipsis 400C demonstrates that the development environment 400 may take on other forms as well. Examples of these other forms include, but are not limited to, text editors, source code editors, debuggers, other specialized development tools, or even an online browser-based system. Accordingly, the development environment 400 may be any application or environment in which a developer is able to operate on source code.

Turning first to the collaborative code review environment 400A, this type of environment is designed to maximize collaboration between multiple developers. Within such an environment, each developer can submit a code review request. A code review request is a type of submission that notifies other developers regarding proposed changes to a portion of the developer's source code. Optionally, the code review request may identify a change that the developer made. In such a scenario, the code review request may inform the other developers that help is desired to review and/or improve the changed code. In other situations, the code review request may simply identify a portion of source code and include a request for help on how to improve the as-yet-unchanged code. One non-limiting example of a code review request is a "pull request."

In this manner, the collaborative code review environment 400A provides a friendly, collaborative environment for developers to jointly review and improve code. Accordingly, the codebase's change may occur as a part of a code review request within the collaborative code review environment 400A.

Alternatively, the codebase's change may occur within the IDE 400B. The IDE 400B is a type of environment that enables a developer to generate, edit, and/or debug source code. Accordingly, just like the collaborative code review environment 400A, the IDE 400B offers another venue through which source code changes may occur.

Returning to FIG. 3, the developer may use the development environment 325 to either make changes to the codebase 330 or to make other developers aware of the codebase 330 so that they can make or propose changes. To enable the service to assume the role of a collaborative developer (as discussed earlier), the bot service 320 (and/or a client of the bot service 320) is able to monitor the codebase 330 directly or indirectly. In this manner, the bot service 320, whether from information it acquired on its own or from information it acquired from another entity (e.g., its client), is able to identify when the codebase 330 has changed. The information 340 symbolically represents that the bot service 320 is able to identify, obtain, or receive information about any changes made to the codebase 330 (hereinafter simply "obtain a code change"). As discussed, a codebase includes source code, but it may also include databases, metadata, and libraries, just to name a few other features. As such, the change may occur to any information included within a codebase, and not just to source code.

After the bot service 320 obtains a code change, the bot service 320 then performs an initial analysis to determine the scope of the change. As an example, the scope of the change may reflect that an entire function within the codebase 330 was significantly rewritten. Alternatively, the scope of the change may reflect that only a variable name was corrected for spelling. In certain circumstances, the scope of the change may reflect that some of the code documentation was updated. In any event, the scope of the change indicates the type and extent of the changes that occurred. Some of these changes may be major changes (e.g., changing the functionality of a method or function) while other changes may be more trivial (e.g., updating the code documentation).

Accordingly, the information 340, which may be included in a notification that the bot service 320 receives, may include the scope, extent, relevancy, and/or overall impact of the change. Using this information, the bot service 320 is able to determine whether the change is sufficiently worthwhile or impactful so as to trigger an "analysis" of some or all of the codebase 330. In the example where a function was significantly rewritten, the bot service 320 will likely determine that an analysis should be triggered. In the example where the code documentation was updated, however, the bot service 320 will likely determine that an analysis is not warranted. In some implementations, the scope, relevancy, and/or overall impact of the change may alternatively be pulled from a collaborative code review request, a service, or some other environment.

Here an example will be helpful. Consider an implementation in which a code review request is submitted. When such a request is used, then the bot service 320 is able to open the code review request and determine the nature, scope, and impact of the codebase change. Now, consider an implementation involving an IDE. When the codebase change is made from within an IDE (e.g., IDE 400B from FIG. 4), then the bot service 320 is able to receive information from the IDE (i.e. from its "client") to detect the nature, scope, and/or impact of the change.

Subsequently, the bot service 320 then determines what analysis, or multiple analyses, (hereinafter, the singular form "analysis" will be used for simplicity purposes) should be performed in order to evaluate the codebase change. In the example involving a change to a variable name, the bot service 320 may determine that a variable rename analysis should be performed. Such an analysis may gauge whether a proper variable name was used to adequately reflect its context and use.

Additionally or alternatively, the bot service 320 may determine that a variable misuse analysis should be performed (e.g., was a variable used in the proper manner based on its context?). Additionally or alternatively, the bot service 320 may determine that other analyses should be performed, which analyses include, but are not limited to, a semantic analysis, a policy compliance analysis, a best practices analysis, a documentation analysis, an efficiency analysis, a plagiarism analysis, a duplication analysis, a code similarity analysis (i.e. is any portion of the current codebase similar to another codebase), a refactoring analysis, or any other kind of analysis that can be performed on a codebase, including its metadata.

After determining which analysis is desired, the bot service 320 then calls the orchestrator 310 to inform the orchestrator 310 about the selected analysis. In one example implementation, the bot service 320 transmits a package of information regarding the analysis to the orchestrator 310. This package may include the codebase changes as well as instructions detailing how the analysis is to be performed. Once the package is formed, then the bot service 320 sends this package to the orchestrator 310 so the orchestrator 310 may commence with managing the analysis in accordance with the instructions.

In a different implementation, the bot service 320 simply packages the codebase changes and provides an instruction informing the orchestrator 310 that the orchestrator 310 is to handle how the selected analysis is to be performed. In some circumstances, the bot service 320 may package additional information describing the specific context that is associated with the change (i.e. a "change context"). In any event, for these embodiments, the bot service 320 allows the orchestrator 310 to handle the details on how to perform the analysis such that the bot service 320 plays only a minor role in managing the analysis.

Throughout this disclosure, reference has been made to a "change context." Here, it is worthwhile to note that in some implementations the bot service 320 is able to extract at least a part of the change context from the context 335. To extract this change context, the service may first identify the program files that include at least a part of the codebase 330. Using these program files, the service may then build a context graph that describes the state of the codebase 330. This context graph may describe the dependencies and relationships for each part of the codebase 330. In some instances, this context graph includes or describes various context portions that demonstrate how each element in the codebase 330 corresponds to other elements in the codebase 330. Additionally, this context graph may describe the relationship between different variables. Accordingly, the context 335 may include all of the information described above, and the change context may be extracted from the context 335.

In any event, once the context 335, which includes the context graph, is built, then specific context portions from within the graph can be extracted. Here, these specific context portions relate to the changes that were made to the codebase 330 (i.e. the "change contexts"). In this manner, the service can obtain not only the portion(s) of the codebase 330 that changed, but it can also obtain specific context about those changed portions.

In another scenario, the process of obtaining the change context initially includes identifying the context 335. As the codebase 330 changes, so too does the context 335. In this manner, the context 335 also changes to reflect the changes that were made to the codebase 330.

Subsequently, specific context portions (i.e. "change context") are extracted from the context 335 based on a determined scope of the changes that were made to the codebase 330. Therefore, the change context may be extracted from the context 335, and the change context provides useful information in understanding the relevancy of the changes that occurred to the codebase 330.

While the above disclosure focused on situations in which the bot service 320 obtained the change context, other scenarios are also conceived. For example, FIGS. 5A and 5B show alternative configurations regarding how to obtain the change context.

Figure 5A:
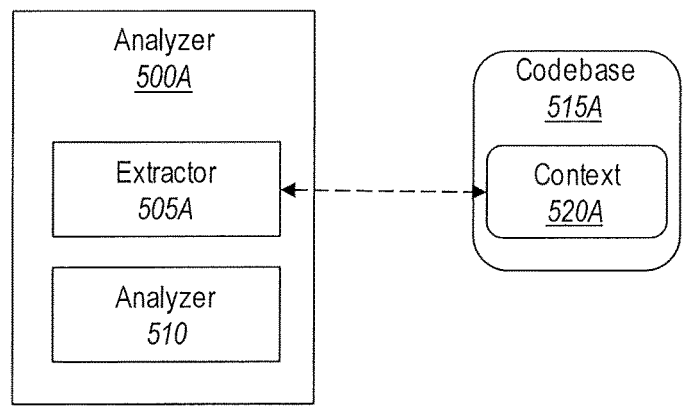
FIGS. 5A and 5B demonstrate various different configurations of an analyzer component and an extractor component, which components may be used when performing an analysis on a codebase.

In particular, FIG. 5A shows that an analyzer 500A (which is an example implementation of one of the analyzers 305 from FIG. 3) includes an extractor 505A and an analyzer 510. Here, the extractor 505A is able to access a codebase 515A (which is an example of the codebase 330 from FIG. 3) as well as the context 520A (which is an example of the context 335). In this manner, the extractor 505A, which is a part of the analyzer 500A, may extract the change context from the context 520A as opposed to the bot service 320 extracting the change context. Therefore, in these implementations, the analyzer 500A identifies and accesses the change context.

Figure 5B:
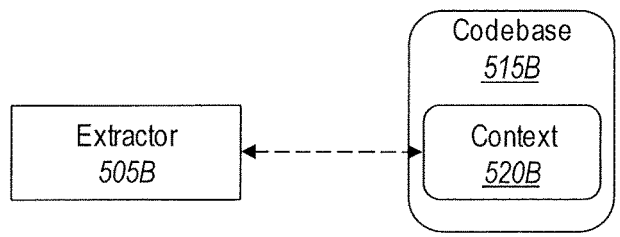

FIG. 5B presents an alternative configuration using a dedicated extractor 505B, which may be separate from the analyzers 305, the orchestrator 310, and/or the bot service 320 from FIG. 3. As shown in FIG. 5B, the extractor 505B can access the codebase 515B and the context 520B. In this manner, the extractor 505B can extract the change context. Subsequently, the extractor 505B can deliver the change context to whichever entity is in need of it. Accordingly, multiple different configurations are available for obtaining the change context.

Returning to FIG. 3, the bot service 320 acts to abstract the details of the change so that the orchestrator 310 can operate without having to understand how the changes occurred or who made the changes. Instead, the orchestrator 310 is simply provided with at least a portion of the codebase 330 and instructions to coordinate the execution of one or more analyses on that portion of the codebase 330. Once the orchestrator 310 receives its instructions from the bot service 320, then the orchestrator 310 triggers one or more of the analyzers 305 so that they can begin performing the desired analyses. In any event, the instructions include enough information for the orchestrator 310 to determine which of the analyzers 305 should be triggered.

As shown in FIG. 3, the analyzers 305 and/or the orchestrator 310 are able to pull information from other sources (e.g., the base knowledge repository 315). The base knowledge repository 315 may include the service's learning model, as discussed earlier. Additionally or alternatively, the base knowledge repository 315 may include additional context and/or information about the codebase or the codebase change. Although FIG. 3 shows that the analyzers 305 are able to pull information from the single base knowledge repository 315, each analyzer may additionally or alternatively have its own corresponding base knowledge repository.

Figure 6:
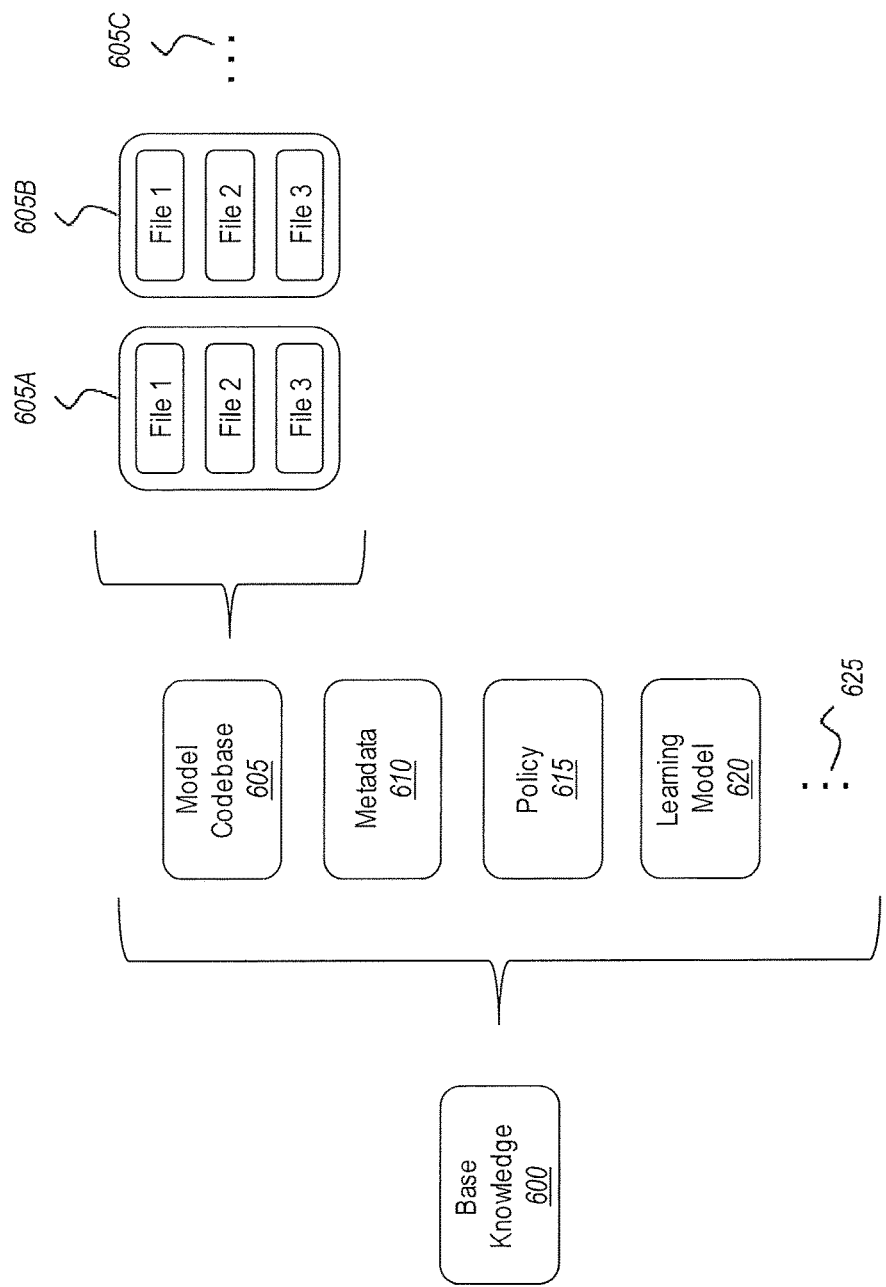
FIG. 6 shows that a learning model may be developed by learning about various different "model coding practices" using a large corpus of training data.

With that background, attention will now be turned to FIG. 6. Specifically, this figure illustrates some of the content that may be included in a base knowledge repository 600, which is an example implementation of the base knowledge repository 315 shown in FIG. 3. Here, FIG. 6 shows that the base knowledge repository 600 may include a model codebase 605 (e.g., a corpus of model data), metadata 610, policy 615, and a learning model 620. The ellipsis 625 demonstrates that the base knowledge repository 600 may include other information as well.

With that in mind, the base knowledge repository 600 is available to the orchestrator 310 and/or the analyzers 305 so that the analyzers 305 can have as much relevant information as needed in order to perform their analyses. As one example, consider a situation in which the developer is developing code for an enterprise. This enterprise might have a set of best practices and/or a corpus of model data (as discussed earlier). To illustrate this, FIG. 6 shows that the model codebase 605 may include a first enterprise project 605A and a second enterprise project 605B. The ellipsis 605C demonstrates that any number of model enterprise projects may also be available. Further, each of these enterprise projects includes a set of files (e.g., File 1, File 2, File 3, etc.) that may include source code. As a result, the model codebase 605 provides a wealth of information regarding the enterprise's preference on how code is to be developed. As discussed earlier, the model codebase 605 constitutes a corpus of model data that may be used to train the service on what model code looks like. Information can be added or removed from the model codebase 605 at any time and for any reason.

Continuing with the above example, by analyzing and learning from the model codebase 605, a determination can be made that the enterprise or team prefers to use certain conventions in how code is developed (e.g., perhaps variables are supposed to be named in a particular manner). Here, the service is able to learn from this wealth of knowledge to identify semantics, patterns, usages, coding techniques, and/or other best practices that should be followed. Based on this learned information, a learning model 620 may be generated, as described earlier. When the analyzers 305 analyze other codebases, then the analyzers 305 can use the learning model 620 to analyze those other codebases. It should be noted that this learning model 620 is not a static model. Rather, the learning mode 620 may be dynamically updated thus enabling the analyzers 305 to continuously learn, improve, and expand their respective analyses.

In this manner, the analyzers are able to use the learning model 620 to determine whether a current codebase (e.g., codebase 330 from FIG. 3) was written in accordance with the semantics, patterns, and models that were previously learned. Even further, when the analyzers perform their respective analyses, they can also determine whether the specific portion of the codebase that changed is still consistent with the semantics, patterns, and models of the other portions of that same codebase, regardless of the model codebase 605.

In addition to accessing the model codebase 605, access is also available to metadata 610 about (1) the code changes, (2) the current codebase (e.g., codebase 330 from FIG. 3), or (3) any other information (e.g., information about the model codebase 605 such as who the developers where or information about which developers are available to help with writing the current codebase). Furthermore, access to enterprise policy 615 is also available. In this manner, the analyzers can (1) use the learning model 620 to analyze a codebase and (2) identify and use additional information that may be relevant or important for the analysis.

Returning to FIG. 3, focus will now be directed to the analyzers 305. Here, each of the analyzers 305 is configured to perform a different type of analysis (e.g., the variable misuse analysis, the variable renaming analysis, etc.) using either a common learning model or a learning model specific to each analyzer. Because each analyzer is different, the type of output that is generated will be different and will be based on the type of analysis that is performed.

Furthermore, different analyzers may be available for different projects or codebases. In some situations, a registration process associated with the codebase 330 may determine which analyzers are available for that codebase 330.

For example, in some circumstances, each codebase (e.g., the codebase 330) is registered with the orchestrator 310 prior to an analysis being performed on that codebase. Additionally or alternatively, the bot service 320 may be registered with a client application that is monitoring the codebase 330. As an example, when a pull request service is being used, then the bot service 320 may be registered with the pull request service so that the bot service 320 can interact with any pull requests (e.g., new and/or changed pull requests) that are generated from the pull request service.

The bot service 320 might also register with the orchestrator 310. In this manner, the orchestrator 310 and/or the bot service 320 may be registered with one or more codebases. Additionally, they may have one or more registered tenants. Regardless of how many different codebases or tenants are registered, the architecture 300 is still able to provide access controls to isolate one codebase and/or tenant from another codebase and/or tenant.

To clarify, the architecture 300 is able to provide access controls for the codebase 330. In some implementations, these access controls may be achieved via an authentication that is performed prior to the codebase 330 being accessed by the bot service 320 and/or any of the other components shown in FIG. 3. To provide further access control protections, some implementations cause each of the analyzers 305 to be just an instance of a corresponding analyzer. In this manner, the instances provide isolation/segregation between the analysis performed for the codebase 330 and other analyses performed by other instances using different codebases.

Returning to FIG. 3, the orchestrator 310 uses the information received from the bot service 320 to select which of the analyzers 305 will perform an analysis based on the scope and/or nature of the change. In some instances, the orchestrator 310 may determine that no analyzers are to be triggered while in other instances the orchestrator 310 may determine that one, two, three, or any number of analyzers are to be triggered. Because each of the analyzers 305 performs a different analysis, multiple different analysis results can be returned.

With that said, once the orchestrator 310 selects which of the analyzers 305 will be used to perform the desired analysis on at least the portion of the codebase that changed, then those selected analyzers will perform their respective analyses. Each analyzer may perform its respective analysis using a common learning model and/or a learning model that is specific to each analyzer. In this manner, the analyzers 305 are able to use their learned information in order to perform an analysis.

As the analysis finishes, the orchestrator 310 can learn of the results of the analysis in a variety of ways. For instance, the analyzers 305 may individually or collectively publish their results to the orchestrator 310 by packaging the results and sending them to the orchestrator 310. Alternatively, the analyzers 305 may store the results (or cause them to be stored at a specified location) and simply send a notification to the orchestrator 310 with information on how the results may be obtained. Alternatively, the orchestrator 310 may periodically ping/poll the analyzers 305 to learn when the results are finalized. In any event, the orchestrator 310 eventually obtains the results of the analysis.

In some implementations, the orchestrator 310 automatically forwards these results to the bot service 320. In alternative implementations, however, the bot service 320 is configured to periodically poll the orchestrator 310 in order to acquire the analysis results. In any event, the bot service 320 eventually acquires the results. Once received, then the bot service 320 is able to cause at least some information of the results to be rendered (e.g., surfaced) to the developer via the development environment 325.

As an example, when the development environment 325 is a collaborative code review environment (e.g., the collaborative code review environment 400A from FIG. 4), then a collaborative code review request service may be running. This service may be configured to periodically poll the orchestrator 310 and/or the bot service 320 to inquire about the results of the analysis. Alternatively, when the development environment 325 is an IDE (e.g., IDE 400B from FIG. 4), then the IDE may be configured to receive and display the results. Accordingly, the results are rendered to the user via the development environment 325.

In some instances, the analysis results may include insights on how to improve the language and/or flow of the codebase 330, particularly with respect to any changes that were made to the codebase 330. For instance, the insights may take the form of a textual recommendation, an indication of actions that could be taken, an automated fix (e.g., generated code) that could be applied, or any other form.

As discussed earlier, the analysis results (e.g., the insights) provided by the analyzers 305 can be generated using a learning model that has learned various patterns and usages from an entire codebase (e.g., not just the code itself, but the code history, production data such as exceptions, performance information, coding bug, coding changes, and so forth). Additionally, the analysis results may identify one or more portions of the codebase 330 that do not follow the service's learned coding practices.

Furthermore, the analysis results may identify other points of interest in the codebase 330 that may be modified, adapted, or otherwise improved. Even further, the analysis results may identify when wrong and/or inefficient code has been used, which code, if left unchecked, may result in unintended or undesired consequences. Accordingly, an analysis on the codebase 330 (and in particular on a changed portion of the codebase 330) can be performed in order to provide insights to the developer to help improve the codebase 330.

While the above illustrations and architectures focused on a scenario in which the analyzers 305, the orchestrator 310, and the bot service 320 were all separate entities, other configurations and implementations are also available. To illustrate, the bot service 320 and the orchestrator 310 may actually be a single, combined entity that works in unison with the analyzers 305. Alternatively, the analyzers 305 and the orchestrator 310 may be a single entity working in unison with the bot service 320. Yet another implementation may occur in which those three entities are actually the same entity as opposed to being three separate entities. As such, while FIG. 3 provided a useful illustration to demonstrate the advantageous principles achieved herein, the broader principles should also be considered and applied.

In this manner, significant advantages are realized by practicing the disclosed principles in the example environment shown in FIG. 3. With that said, however, the above advantages are not the only benefits achieved herein. Indeed, the analyzers 305 are also able to learn and perpetually improve using (1) machine learning on the codebase 330 (as discussed above) and (2) feedback (explicit or implicit) obtained from the rendered (i.e. surfaced) results. With that in mind, attention will now be directed to FIG. 7.

Learning from Developer Feedback

Figure 7:
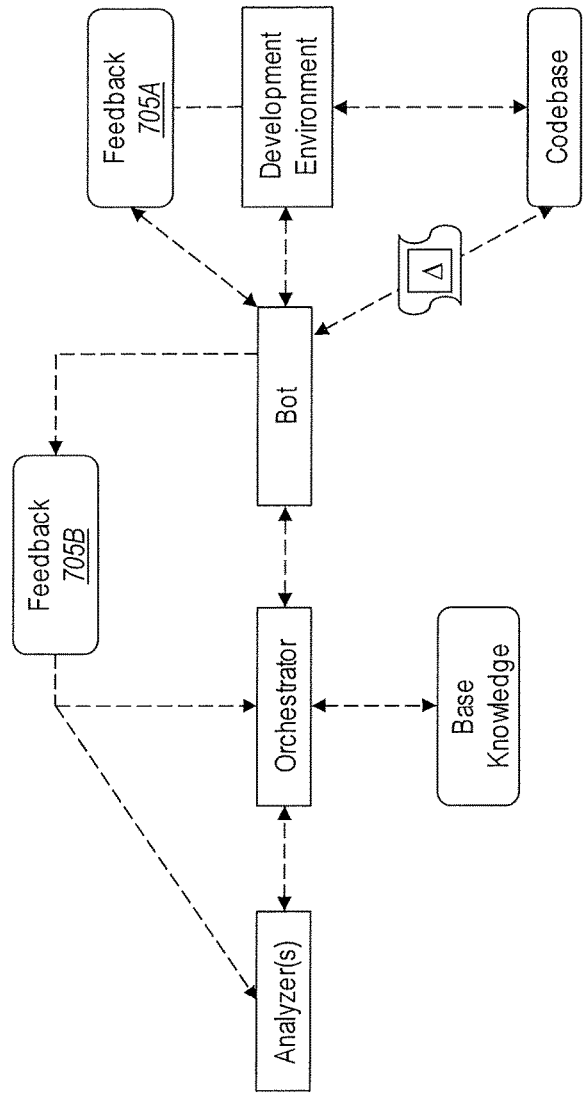
FIG. 7 illustrates an example architecture showing a feedback loop that may be used to modify a subsequent analysis and to perpetually learn from both past results as well as developer reactions to those results.

In particular, FIG. 7 illustrates an example architecture 700 that is slightly different than the architecture 300 of FIG. 3. Because many of the components are the same, these common components will not be relabeled. In fact, the primary difference between architecture 700 and architecture 300 is the presence of a feedback loop (e.g., see the feedback 705A and 705B being passed between different components).

Here, the bot service is able to monitor the codebase and/or the development environment to detect how the developer responded (i.e. feedback 705A) (e.g., explicit or implicit feedback) to the analysis results. Once the bot service identifies the feedback 705A, then it can pass some or all of that feedback to the orchestrator and/or the analyzers (as shown by feedback 705B). In this manner, obtaining the feedback 705A and passing the feedback 705B constitutes a feedback loop. By acquiring this feedback, the learning model can be updated, and the service can continuously learn how to improve its analysis of a codebase as well as the suggestions it provides to the developer. It follows then that the service can learn not only from a corpus of model data, but it can also learn from ongoing developer feedback, which may be received in response to the displayed insights.

As discussed in relation to the method 200 of FIG. 2, some implementations are able to determine how the developer responded to the analysis results and then modify their performance based on the results (e.g., perhaps by modifying a subsequent analysis performed by the analyzers). This is achieved through the feedback loop. In this manner, the analyzers are able to learn from past results and then modify how they operate based on the learned information. This allows the service's learning model to further grow and dynamically change.

In light of the above understanding, it may be beneficial to assign a weight to the insight after determining how the developer responded to that suggestion. To clarify, the weight of a suggestion may be realized by analyzing how the developer responded to the suggestion. In some circumstances, the weight of the suggestion may even be personalized to the identity of the developer that responded to the suggestion.

Example responses that might be analyzed to determine this weight could include determining edits to the codebase that were made after the insight (particularly at the point where the change is suggested). If the developer edited the codebase consistently with the insight, that might tend towards a higher weight being assigned to the insight. Some information about the weight of the insight might also be determined based on a developer not responding to the insight at all. Such a case would denote that the insight may not have been particularly valuable to the developer, or even that the insight caused the developer to pursue an alternative course of action. Alternatively, a developer might provide an explicit indication of the weight of the insight, as will be discussed below.

Example User Interfaces for Displaying Insights and Identifying Feedback

Building on the understanding presented above, attention will now be directed to FIG. 8 which shows an example user interface 800. Here, this user interface 800 is an implementation of an IDE (e.g., the IDE 400B of FIG. 4). As shown, the user interface 800 is displaying source code 805, which may be included in the codebase 330 from FIG. 3.

In this situation, the developer generated the source code 805 using different variables. As shown by the circled variables 810, the developer used a variable having the name "var." In many coding languages, "var" is a reserved term and should not be used as a variable name. Thus, in this situation, the developer is attempting to use a variable name that probably should not be used. By following the principles discussed earlier, the embodiments are able to analyze the source code 805 to provide insights on how the source code 805 may be improved.

In one scenario, the analyzers may determine that the variable name "var" may be contrary to what should be there given the learning model. Additionally or alternatively, the analyzers may determine that the variable name "var" is not an optimal name to use in that particular context or setting given the learning model. Based on this analysis, the analyzers may return with a result suggesting that "var" be changed to something else, such as "myVariable" or "foo." Furthermore, not only can an alternative name be provided, but the service can also analyze some or all of the source code 805 as well as other codebases (e.g., from the enterprise) to determine which name might be best or optimal for this particular use scenario or context.

In this example, the analyzers are able to analyze the surrounding use context in which this variable is being used and then tailor a new variable name that best corresponds to this particular scenario. In this manner, the analyzers do not simply provide an alternative variable name, instead, they generate a variable name that is best suited for use in that particular situation (i.e. they generate an intelligent action item that the developer may adopt).

Accordingly, the analyzers provide intelligently designed insights based on a detailed understanding of how those insights may potentially impact the source code 805 as a whole. Therefore, instead of providing a stale or otherwise non-intelligent/rote option, a highly intelligent/thoughtful option is presented to the developer. Of course, it will be appreciated that the above variable naming scenario is simply one example use. In fact, the analyzers are able to operate in other scenarios (discussed earlier) and to provide intelligent insights that have been specifically tailored for these other scenarios.

Returning to FIG. 8, here, the analyzers determined that the name "var" is not an optimal name. Furthermore, the analyzers analyzed the context in which this variable was being used and determined that "foo" would be a better name. Of course, "foo" is simply an example and should not be viewed as binding.

Thereafter, the analysis results were presented to the developer via suggestion box 815. As illustrated, the suggestion box 815 includes the name of a bot service (here, the name is "SmartBot") as well as an avatar and a timestamp. Additionally, the suggestion box 815 includes the following language, "Based on this repo's code patterns, SmartBot suggests renaming 'var' as 'foo' with confidence 89%." Such language constitutes an "insight." Of course, this language is simply one example of what an insight may look like, and the broader understanding of providing (1) an identification of an issue, (2) a response on how to potentially resolve that issue, and (3) an optional level of confidence associated with that response should be followed.

As indicated above, the suggestion box 815 (1) specifically identifies a point of interest (i.e. the problem name of "var"), (2) presents an intelligent insight on that point of interest (e.g., use the new variable name "foo"), (3) identifies how the insight was developed (e.g., the repo's code patterns were analyzed), and (4) optionally includes a level of confidence that is associated with the insight (e.g., "89%").

This optional level of confidence indicates multiple things. First, it indicates how sure/confident an analyzer is that there is a problem. Second, it indicates how sure/confident the analyzer is that the problem is with that point of interest. Finally, it indicates how sure/confident the analyzer is that its insight will adequately resolve the issue. In this manner, a probability indication may also be rendered with the insight to indicate a level of confidence associated with that insight. Subsequently, SmartBot receives this information from the analyzer and presents it to the developer.

To build on that understanding, an option to adjust a "threshold setting" is also available. This threshold setting relates to a level of confidence that is required before any insights are allowed to be presented to the developer. For example, an adjustable configuration setting is available which, when adjusted, sets a confidence threshold that must be satisfied before an insight will be presented to the developer. Alternatively, the threshold may be a team variable. In fact, there may be multiple thresholds, such that an insight that satisfies only a low threshold has less emphasis, whereas an insight that satisfies a higher threshold has stronger wording or emphasis.

As an example, the developer may set the minimum threshold value at 80%. As a result of this minimum value, only insights that have a confidence level of 80% or higher will be displayed. In this manner, the developer can control the quality, accuracy, and reliability of the insights that are displayed. It follows then that by adjusting the threshold setting, the developer is also adjusting how often insights will be displayed (i.e. how "chatty" the bot service is).

The suggestion box 815 additionally includes a like button 820 and a dislike button 825, which may be used to provide positive or negative feedback, respectively. In some instances, the developer may decide that the insights are good and valid, yet still not act in response to those insights. In order to provide feedback so that the learning model can continue to learn, the developer can mark the insights in a positive or negative manner by selecting the like or dislike buttons 820 and 825. As a result, the service will know whether its insights were worthwhile to the developer. As more feedback is obtained or learned from the developer, the service can continuously learn and can improve its subsequent analyses and insights.

In some instances, the feedback may be explicit. Examples of explicit feedback include, but are not limited to, the following: the developer selected either the like button 820, the dislike button 825, or the developer edited the codebase in accordance with the insight. In other instances, the feedback may be implicit. Examples of implicit feedback include, but are not limited to, the following: the developer ignored the insight by not editing the codebase, by not selecting the like/dislike buttons, or, in some cases by making alternative edits to the codebase. These examples of implicit feedback implicitly suggest that the developer may not have agreed with the insights and that the analyzers may modify their subsequent analyses based on this implicit feedback. In any event, this feedback may be identified automatically, without any explicit indication that the developer is providing "formal" feedback.

Figure 9:
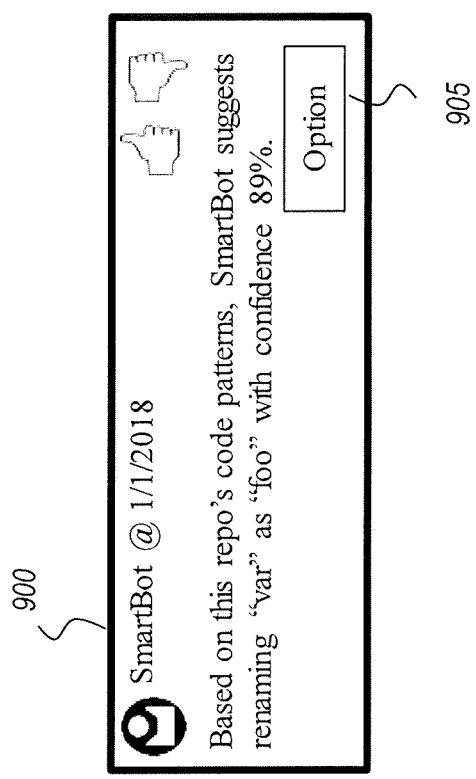
FIG. 9 illustrates an example suggestion box in which the results of a code analysis may be displayed to a developer.

Turning now to FIG. 9, this figure illustrates another example of a suggestion box 900. Here, this suggestion box 900 is a more specific implementation of the suggestion box 815 of FIG. 8. In particular, the suggestion box 900 additionally includes an option button 905. As discussed earlier, the analyzers identified a potential issue and identified how to possibly resolve that issue. In some cases, the solution for the issue may be to edit the codebase.

Accordingly, in one implementation, the option 905 is an option to automatically accept and apply the insights offered by the analyzer. In this manner, the developer will not have to take the time to edit the codebase him/herself. Instead, by selecting the option 905, the codebase can be automatically edited, thus saving the developer a significant amount of time, particularly if there are multiple insights with multiple resolutions. Of course, there may be an option to automatically perform some of the insights while refraining from automatically performing others. In this manner, the option 905 enables the developer to selectively accept which (of potentially many) insights will be adopted.

Turning now to FIG. 10, this figure illustrates another example environment in which the principles may be practiced. In particular, FIG. 10 shows a collaborative code review user interface 1000 (hereinafter simply "UI 1000") (e.g., the UI 1000 may be an example implementation of the collaborative code review environment 400A of FIG. 4). Here, the UI 1000 shows that SmartBot is acting as another contributor who is offering insights on how to improve the developer's codebase. For example, UI 1000 shows that User 1, User 2, SmartBot, and User 3 are all contributing by offering insights. In some instances, the UI 1000 may be connected to a specific portion of the codebase such that the comments are purposefully directed or attached to that portion of the codebase. As such, the principles disclosed herein may be practiced in a variety of different scenarios.

Accordingly, significant advantages are realized through the practice of the disclosed principles. In particular, these principles greatly improve the development of source code (including associated databases, test files, and so forth) because the embodiments provide intelligent, carefully crafted analysis results to the developer. The developer may then use these results to improve his/her code.

The disclosed embodiments may be presented in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising: one or more processors; and
one or more computer-readable hardware storage devices having stored thereon computer-executable instructions that, when executed by the one or more processors, cause the computer system to:
within an architecture that includes one or more analyzer components, receive a notification indicating that a codebase has undergone a change from a collaborative code review request service, the notification including a scope of the change;
access a change context that provides context for the change;
perform, by one of the one or more analyzer components, analysis of the change using at least a portion of the change context,
the one analyzer component selected based on the scope of the change;
detect receipt of a result of the analysis;
receive, by an orchestrator service, the result of the analysis from the one analyzer
component, the collaborative code review request service periodically polling the orchestrator service to inquire about the result of the analysis;
cause at least some information of the result to be rendered to a user;
determine how the user responded to the rendered information; and
automatically modify a subsequent analysis performed by at least the one analyzer component based on how the user responded to the rendered information.

2. The computer system of claim 1, wherein the codebase's change occurs as a part of a collaborative code review request.

3. The computer system of claim 1, wherein accessing the change context includes:
identifying a context of the codebase; and
based on a determined a scope of the change, extracting the change context from the codebase's context, wherein the change context is extracted from the codebase's context as a result of the change context being identified as corresponding to the change.

4. The computer system of claim 1, wherein the one analyzer component identifies and accesses the change context.

5. The computer system of claim 1, wherein each of the one or more analyzer components performs a different type of analysis.

6. The computer system of claim 1, wherein a probability indication is also rendered with the at least some information, the probability indication indicating a level of confidence associated with the result.

7. The computer system of claim 1, wherein determining how the user responded to the rendered information includes determining that the user subsequently edited the codebase based on the at least some information that was rendered.

8. The computer system of claim 1, wherein determining how the user responded to the rendered information includes determining that the user did not subsequently edit the codebase based on the at least some information that was rendered.

9. The computer system of claim 1, wherein determining how the user responded to the rendered information includes receiving a notice indicating that the user marked the at least some information either as positive information or as negative information and using at least that notice to make the determination.

10. The computer system of claim 1, wherein modifying the subsequent analysis performed by the one analyzer component includes causing the one analyzer component to learn from the result.

11. A method for improving user development of source code, the method being implemented by a computer system that includes one or more processors, the method comprising:
within an architecture that includes one or more analyzer components, receiving a notification indicating that a codebase has undergone a change from a collaborative code review request service, the notification including a scope of the change:
accessing a change context that provides context for the change;
performing, by one of the one or more analyzer components,
analysis of the change using at least a portion of the change context, the one analyzer component selected based on the scope of the change;
detecting receipt of a result of the analysis;
receiving, by an orchestrator service, the result of the analysis from the one analyzer component, the collaborative code review request service periodically polling the orchestrator service to inquire about the result of the analysis;
causing at least some information of the result to be rendered to a user;
determining how the user responded to the rendered information; and
automatically modifying a subsequent analysis performed by at least the one analyzer component based on how the user responded to the rendered information.

12. The method of claim 11, wherein the one or more analyzer components are selected for use during a registration of the codebase.

13. The method of claim 11, wherein the computer system additionally provides access control for the codebase such that an authentication is performed prior to accessing the codebase.

14. The method of claim 11, wherein at least a part of the change context is extracted from a context associated with the codebase, and wherein the context is generated by:
identifying program files that include at least a part of the codebase; and
building a context graph based on the program files.

15. The method of claim 11, wherein each of the one or more analyzer components is an instance that provides isolation between the analysis performed for the codebase and other analyses performed for different source code by other instances.

16. The method of claim 11, wherein the change context includes one or more context portions associated with the change.

17. One or more hardware storage devices having stored thereon computer-executable instructions that are structured to be executable by one or more processors of a computer system to thereby cause the computer system to:
within an architecture that includes one or more analyzer components, receive a notification indicating that a codebase has undergone a change from a collaborative code review request service, the notification including a scope of the change:
access a change context that provides context for the change;
perform, by one of the one or more analyzer components, analysis of the change using at least a portion of the change context,
the one analyzer component selected based on the scope of the change;
detect receipt of a result of the analysis;
receive, by an orchestrator service, the result of the analysis from the one analyzer
component, the collaborative code review request service periodically polling the orchestrator service to inquire about the result of the analysis;
cause at least some information of the result to be rendered to a user;
determine how the user responded to the rendered information; and
automatically modify a subsequent analysis performed by at least the one analyzer component based on how the user responded to the rendered information.

* * * * *